US012288628B2

(12) United States Patent
Strangis

(10) Patent No.: US 12,288,628 B2

(45) Date of Patent: Apr. 29, 2025

(54) METHOD AND APPARATUS FOR PRODUCTION OF RADIOMETALS AND OTHER RADIOISOTOPES USING A PARTICLE ACCELERATOR

(71) Applicant: Saverio Roberto Strangis, Pearland, TX (US)

(72) Inventor: Saverio Roberto Strangis, Pearland, TX (US)

(*) Notice: Subject to any disclaimer, the term of this patent is extended or adjusted under 35 U.S.C. 154(b) by 325 days.

(21) Appl. No.: 17/660,621

(22) Filed: Apr. 25, 2022

(65) Prior Publication Data

US 2022/0254537 A1 Aug. 11, 2022

Related U.S. Application Data

(62) Division of application No. 16/777,271, filed on Jan. 30, 2020, now Pat. No. 11,315,700.

(51) Int. Cl.

*G21G 1/10* (2006.01)
*G21K 5/08* (2006.01)
*H05H 6/00* (2006.01)
*G21G 1/00* (2006.01)

(52) U.S. Cl.

CPC ................. *G21K 5/08* (2013.01); *G21G 1/10* (2013.01); *H05H 6/00* (2013.01); *G21G 1/001* (2013.01)

(58) Field of Classification Search

CPC ........... G21G 1/001; G21G 1/10; G21K 5/08; H05H 6/00

See application file for complete search history.

(56) References Cited

U.S. PATENT DOCUMENTS

| | | | | |
|---|---|---|---|---|
| 2,504,595 | A | 4/1950 | Reid | |
| 2,640,934 | A | 6/1953 | Mcmillan | |
| 3,694,313 | A * | 9/1972 | Blue | G21G 1/10 423/249 |
| 5,586,153 | A | 12/1996 | Alvord | |
| 5,917,874 | A | 6/1999 | Schlyer et al. | |

(Continued)

FOREIGN PATENT DOCUMENTS

| | | |
|---|---|---|
| AU | 706791 | 6/1999 |
| BE | 1011263 | 6/1999 |

(Continued)

*Primary Examiner* — Sharon M Davis

(74) *Attorney, Agent, or Firm* — Edison Law Group; Jerome Drabiak

(57) ABSTRACT

An irradiation target positioning device and method for creating radioisotopes utilizing linear particle beam accelerators or cyclotron accelerators is disclosed. The device positions a target proximate to a liquid reservoir and vapor expansion chamber. The target may be in a solid phase. Heat produced within the target during irradiation can be absorbed by the liquid. The liquid may be heated to its vaporization temperature and vapor emitted into the vapor chamber. The vapor chamber may utilize a cooling mechanism, for allowing the vapor to condense (second phase change). A radioactive product may diffuse into the liquid, thereby allowing the irradiated product to be conveyed out of the target structure in a liquid, solution, or slurry. Multiple radioisotopes may be produced simultaneously out of the target material and liquid and separated later. The target material and the irradiated product may be removed from the target surface by acid.

7 Claims, 19 Drawing Sheets

(56) References Cited

U.S. PATENT DOCUMENTS

| | | | | |
|---|---|---|---|---|
| 6,359,952 | B1 | 3/2002 | Alvord | |
| 6,586,747 | B1 | 7/2003 | Erdman | |
| 7,127,023 | B2 | 10/2006 | Wieland | |
| 7,512,206 | B2 | 3/2009 | Wieland | |
| 7,831,009 | B2 | 11/2010 | Alvord et al. | |
| 8,073,095 | B2 | 12/2011 | Hur et al. | |
| 8,488,733 | B2 | 7/2013 | Allen et al. | |
| 8,670,513 | B2 | 3/2014 | Stokely | |
| 9,183,959 | B2 | 11/2015 | Bloomquist et al. | |
| 9,336,915 | B2 | 5/2016 | Norling et al. | |
| 9,961,756 | B2 | 5/2018 | Askebro | |
| 10,109,383 | B1 | 10/2018 | Pagmaste | |
| 10,249,398 | B2 | 4/2019 | Eriksson | |
| 10,354,771 | B2 | 7/2019 | Eriksson | |
| 2004/0000637 | A1* | 1/2004 | Wieland | H05H 6/00 250/284 |
| 2004/0100214 | A1 | 5/2004 | Erdman | |
| 2006/0062342 | A1 | 3/2006 | Gonzalez Lepera | |
| 2009/0090875 | A1 | 4/2009 | Gelbart | |
| 2013/0259180 | A1 | 10/2013 | Norling | |
| 2016/0141062 | A1 | 5/2016 | Zhang | |
| 2017/0048962 | A1 | 2/2017 | Zeisler | |
| 2017/0231080 | A1 | 8/2017 | Johnson | |
| 2017/0367170 | A1 | 12/2017 | Pagmaste | |
| 2018/0322972 | A1 | 11/2018 | Pagmaste | |
| 2019/0019818 | A1 | 6/2019 | Pandey | |
| 2019/0259505 | A1 | 8/2019 | Murakami | |

FOREIGN PATENT DOCUMENTS

| | | |
|---|---|---|
| BE | 101954 | 2/2012 |
| CA | 2788617 | 9/2019 |
| EP | 2425686 | 3/2019 |
| EP | 3242709 | 3/2019 |
| WO | 2008140619 | 1/2009 |
| WO | 2010007174 | 1/2010 |

* cited by examiner

METHOD AND APPARATUS FOR PRODUCTION OF RADIOMETALS AND OTHER RADIOISOTOPES USING A PARTICLE ACCELERATOR

REFERENCE TO RELATED APPLICATIONS

This Patent Application is a Divisional Application of U.S. patent application Ser. No. 16/777,271 filed Jan. 30, 2020, which claims priority to U.S. Provisional Patent Application Ser. No. 62/845,693 filed May 9, 2019, both of which applications are hereby incorporated by reference in their entirety.

FIELD

This invention relates generally to the production of radioisotopes, and, more particularly, to a target system for irradiating a sample material by an accelerated particle beam.

BACKGROUND

A radioisotope, also called radionuclide, is an unstable element that releases excess energy in the form of radiation (particles or electromagnetic waves), while it is converted into a different element (stable or unstable). The radioisotope is said to undergo radioactive decay. The rate of decay is constant. The time taken for the activity of a given amount of a radioactive substance to decay to half of its initial value is called half-life ($t_{1/2}$). The range of half-lives of radioactive atoms spans over many orders of magnitude.

Radioisotopes may be used in several different applications. Medical applications of radioisotopes may include, for example, imaging and measuring of physiological processes or the treatment of cancer.

Radioisotopes may be created by several processes, including subjecting a material to bombardment with accelerated particles. The collision between the accelerated particles, e.g., a stream of protons generated by a cyclotron, and the material, can cause the atomic structure of the material to be altered. The altered atomic structure can be unstable, resulting in discharges of further particles or electromagnetic radiation from the atomic structure over time. This process is called a nuclear reaction. The product created, as a result of the nuclear reaction, will be recognized as a radioactive material. A radioactive material can contain a mixture of radioisotopes.

Many substances may be subjected to this bombardment of accelerated particles. This bombardment is commonly termed irradiation. These substances are termed "targets." The targets can be in a solid, liquid or gas phase.

The existing technology transforms stable substances into radioactive material. Handling of the now radioactive material requires care and specialized facilities or tooling.

It will be appreciated that the particle accelerator produces a substantially linear particle beam. One function of the target structure is to position the target within the beam. The target structure therefore may have a linear orientation parallel to the longitudinal axis of the particle beam.

The transformation of target substances by irradiation, i.e., bombardment of solids, liquids, or gases, generates heat. This phenomenon therefore necessitates heat abatement or cooling mechanisms to be employed. Streams of cold helium gas, as well as jacketing the target holding and positioning structure for conveying cold water or other fluids, have been used for cooling both the target substance and the holding and positioning structure.

As indicated above, the target substance can be a gas. Gases provide a target of limited density, thereby limiting the radioactivity that can be produced via the irradiation process.

In the irradiation of liquids, a target of greater density is provided, increasing the radioactivity that can be produced. The heat of the irradiation process transforms at least a portion of the liquid into a gas phase. The expanding gas creates pressure upon a closed container, i.e., target chamber. Expanding gas can damage or cause a breach of the target structure, resulting in the dispersal of hazardous radioactive material. Prior methods of irradiating liquids have employed a target structure having an enlarged chamber that can capture the vapor.

In the irradiation of solids, the target structure must be adapted to handle the heat generated and to prevent or minimize undesired alterations of the target material.

Attempts have been made to dissolve solids and irradiate liquid solutions. An amount of solids, in a solution is limited, thereby limiting the radioactivity that can be produced via this irradiation process.

The now radioactive product must be removed from the target structure for further processing. It will be appreciated that radioactive materials pose a danger and health hazard to living organisms, obviously this includes workers. Prior methods of irradiating targets have had the challenge of removing the now radioactive product with minimized workers exposure to radiation.

In the process of irradiating gases and liquids, ports connected to the interior of the chamber of the target structure have been used to remotely remove the irradiated target material by pumping gas through one port into the chamber and forcing the target material out through a second port. It will be appreciated that the second port may be connected to a radiation shielded cell, also called a "Hot Cell."

In the process of irradiating solids, the prior art required mechanical disassembly of the target structure to allow removal of the solid target (now radioactive) and transportation to a separate location for further processing.

Attempts have been made for mechanically opening the solid target structure and deposit the target material manually or automatically into a shielded container, thereby making it safe for further handling by workers.

Attempts also have been made for remotely operated mechanical opening the solid target structure and automatic transport of the solid target to a processing cell.

Attempts also have been made for remotely operated mechanical opening the solid target structure, transfer the target into a dissolution apparatus and pumping the dissolved material in liquid form to a processing cell.

However, in the prior art, there have been limited to no available options to add solid target technology with safe mechanism for removal of the irradiated target into existing facilities. The prior art requires mechanical disassembly of the target structure to allow removal and transfer of the solid target after irradiation. It will be appreciated that the solid target (now radioactive) poses a great hazard in as much as the selected target product emits a great amount of radioactivity, typically with long half-life.

SUMMARY

As will be understood, irradiation of substances is useful in the production of radioisotopes. Radioisotopes are a tool used in various applications including biology, wherein the radioisotopes of carbon can serve as radioactive tracers because they are chemically very similar to the nonradioactive nuclides, so most chemical, biological, and ecological processes treat them in a nearly identical way. One can then examine the results with a radiation detector, such as a Geiger counter, to determine where the provided atoms were incorporated. For example, one might culture plants in an environment in which the carbon dioxide contained radioactive carbon; then the parts of the plant that incorporated atmospheric carbon would be radioactive. Radioisotopes can be used to monitor processes such an DNA replication or amino acid transport.

Radioisotopes may also be used in nuclear medicine, being used for diagnosis, treatment, and research. Radioactive chemical tracers emitting gamma rays or positrons can provide diagnostic information about internal anatomy and the functioning of specific organs, including the human brain. This is used in some forms of tomography: single photon emission computed tomography and positron emission tomography (PET) scanning and Cherenkov luminescence imaging. Radioisotopes are also a method treatment in hemopoietic forms of tumors; the success for treatment of solid tumors has been limited. More powerful gamma sources sterilize syringes and other medical equipment.

Further radioisotopes are used for food preservation, radiation is used to stop the sprouting of root crops after harvesting, to kill parasites and pests, and to control the ripening of stored fruit and vegetables.

Radioisotopes are also used in industry and in mining. Radioisotopes are used to examine welds, to detect leaks, to study the rate of wear, erosion, and corrosion of metals, and for on-stream analysis of a various minerals and fuels.

In spacecraft and elsewhere, radioisotopes are used to provide power and heat, notably through radioisotope thermoelectric generators (RTGs). Also, in astronomy and cosmology, radioisotopes play a role in understanding stellar and planetary processes. In particle physics, radioisotopes help by measuring the energy and momentum of their beta decay products.

In ecology, radioisotopes are used to trace and analyze pollutants, to study the movement of surface water, and to measure water runoffs from rain and snow, as well as the flow rates of streams and rivers. Radioisotopes are used in geology, archaeology, and paleontology to measure ages of rocks, minerals, and fossil materials.

Radioisotopes are produced through the nuclear reactions in reactors or from charged particle bombardment in accelerators. In accelerators, the typical charged particle reactions utilize protons although deuterons and helium nuclei (3 He++ and alpha particles) also play a role. One clear advantage that accelerators possess is the fact that, in general, the target and product are different chemical elements.

The production of radioisotopes in a charged particle accelerator such as a cyclotron or in a linear accelerator is achieved through a nuclear reaction wherein the accelerator bombards a directed stream of particles, e.g., protons, at high energy into a chemical element, e.g., zinc or calcium, thereby causing one or more particles to be ejected from the nucleus of the element. The ejection of a particle from the nucleus transforms the original element into a separate element. This separate element is typically unstable and will decay, resulting in the emission of radiation.

This disclosure includes illustration and description of a target and target structure that achieves safe removal of solid irradiated substances from the target structure at the conclusion of irradiation without the requirement of mechanical operations. The disclosure teaches irradiation of a solid target. The disclosure further teaches a novel process causing the target to change in-situ from a solid to a liquid phase to facilitate safe removal of the radioactive material from the target structure. This process is termed hybridization of the structure during and after the irradiation process.

The disclosure also includes a novel method to remove heat from the solid target material during irradiation. The solid target material is positioned in a closed chamber within the target structure to receive the bombardment of particles from the cyclotron. It is within this closed chamber that a substance, initially in liquid form, will be utilized to remove the heat produced during the irradiation process by means of multiple liquid/vapor phase changes.

The disclosure also includes novel configuration of the substrate with the solid target material. Such substrates, also called backing materials, may be used to allow passage of the irradiating particles into the solid material. In some embodiments, the solid material may be contained on an inert metal plate or foil upon which the solid has been attached, e.g., electro-plating. In another embodiment, the foil may be modified to form a receptacle to retain solid material in powdered or metallic form. In yet another embodiment, the solid material maybe positioned between two foil pieces. In yet a further embodiment, multiple foils may be used. After irradiation, the outer most foil (as determined by proximity to the particle beam interface with the target structure) and the target material may be dissolved by acid, e.g., dilute HCl, and then pumped to a processing unit.

The disclosure also describes a solid wall split chamber that is positioned within the target structure and proximate to the foil surface containing the target. The chamber component is open to the surface containing the target. Part of the chamber may hold water or other liquid. The second part of the chamber, configured to be in communication of the first portion of the chamber, can be used to contain vapor formed by the heat of the irradiation process. The solid walls of the second chamber segment may be used as a lower temperature surface to facilitate the condensation of the vapor.

The target component may contain a cooling jacket through which liquid may flow.

BRIEF DESCRIPTION OF THE DRAWINGS

The accompanying drawings, which are incorporated in and constitute a part of the specification, illustrate preferred embodiments of the disclosure. These drawings, together with the general description of the disclosure given above and the detailed description of the preferred embodiments, given below, serve to explain the principles of the disclosure.

The invention may be best understood by reference to the following description taken in conjunction with the accompanying drawings, in which like reference numerals identify like elements, and in which.

Note the elongated opening suited for the split target oriented at an oblique angle to the particle beam.

Figure 10A:
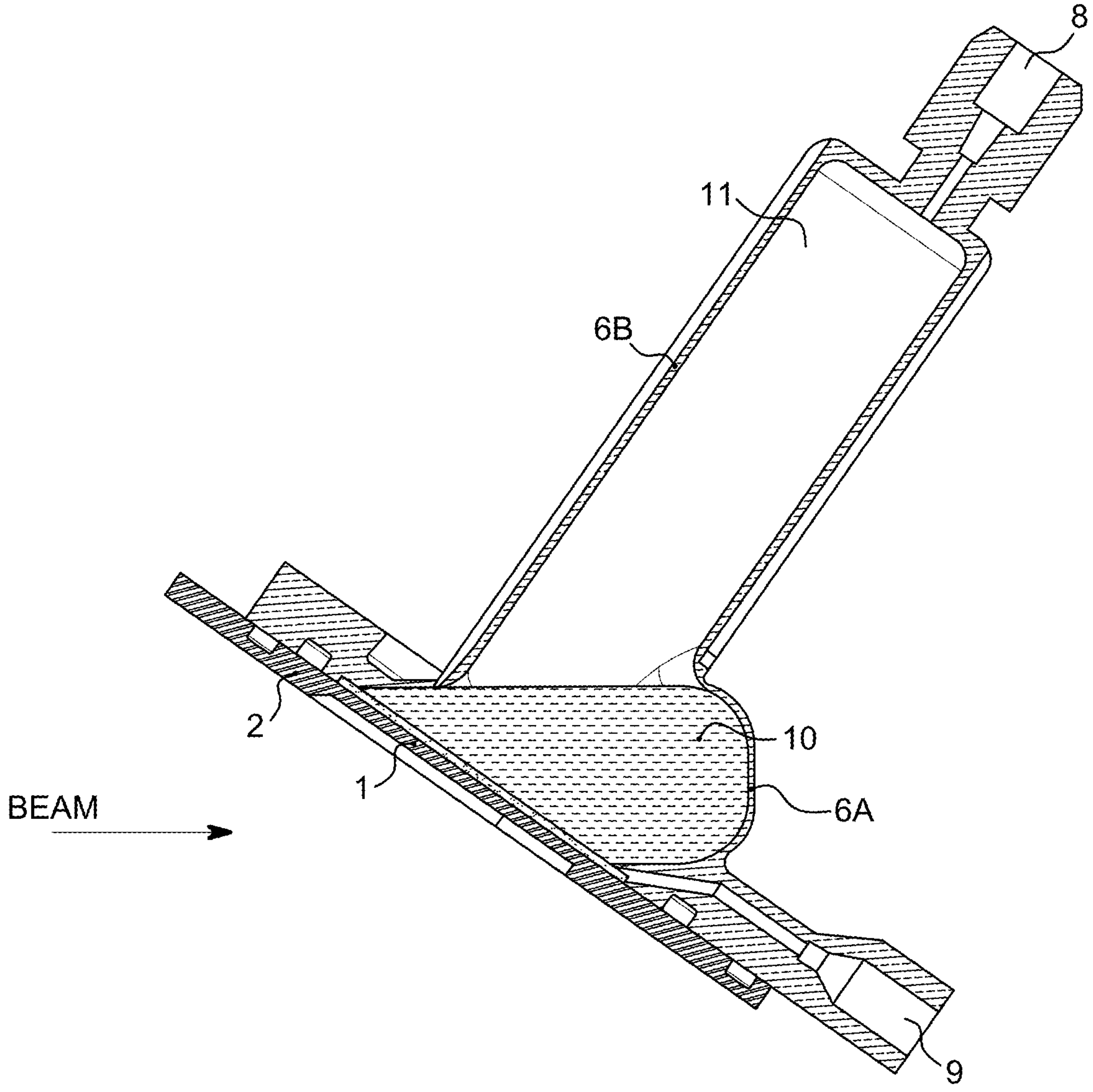
FIG. 10A illustrates a cross-sectional view of the split chamber showing the target positioned in the outer surface (relative to the particle beam) of an energy degrader.
Figure 10B:
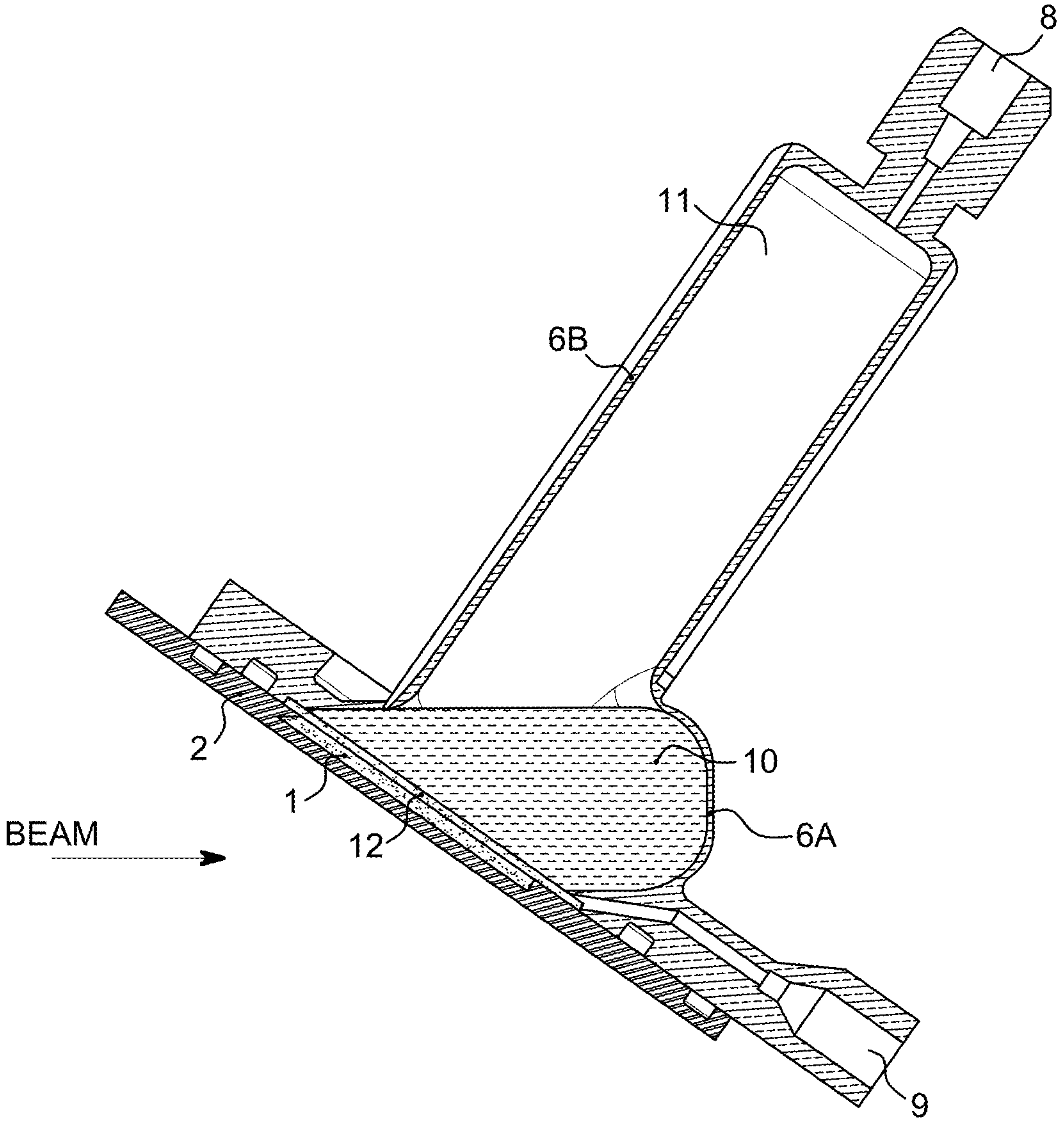
FIG. 10B illustrates another cross-sectional view of the split chamber but with pressed solid target material within an indenture of the energy degrader.
Figure 10C:
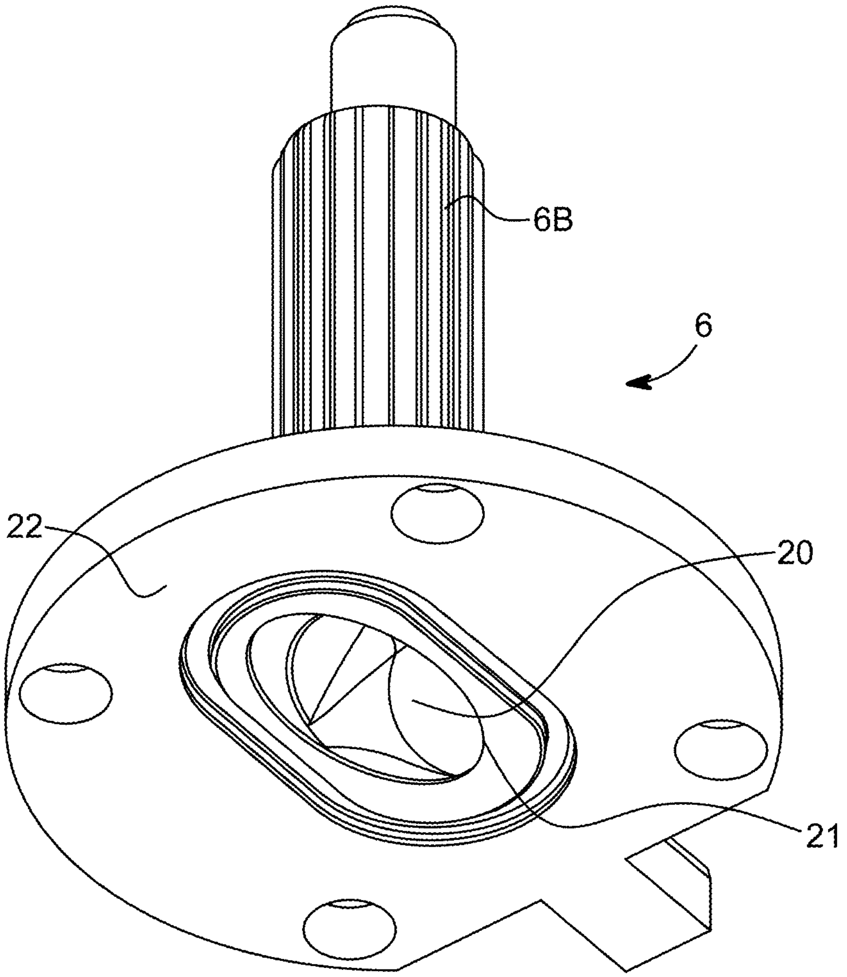
FIG. 10C is a perspective views of the split chamber showing an interior view and the flange which can be used to fasten the chamber to an energy degrader.
Figure 10D:
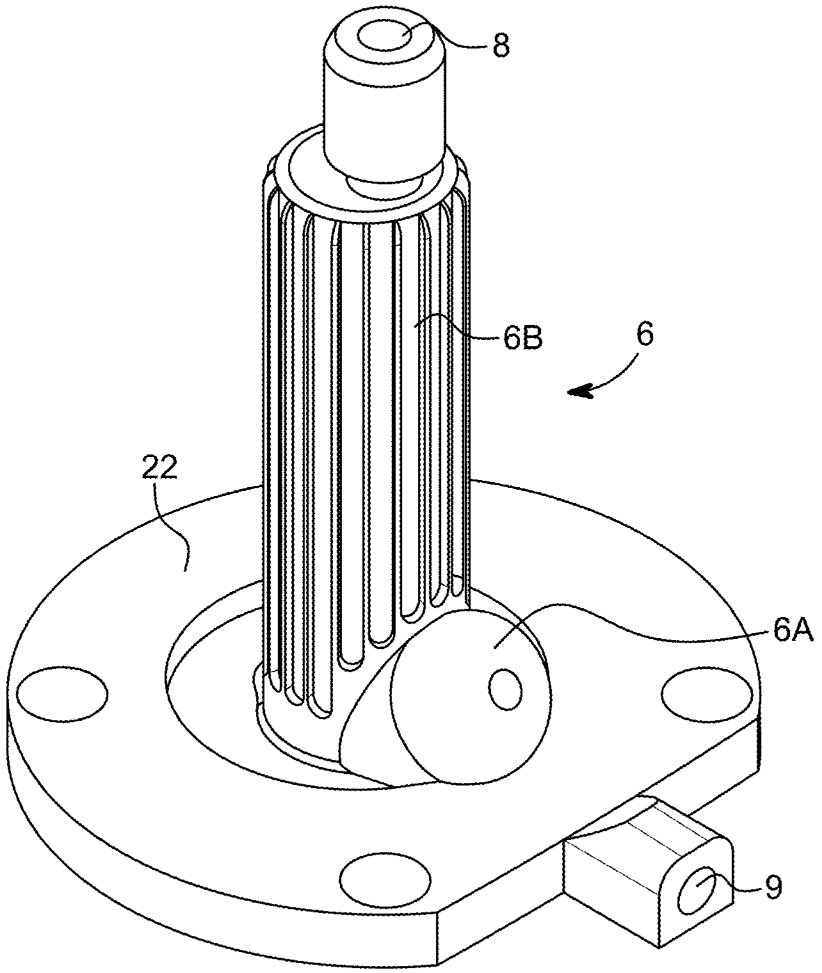

FIG. 10D is another perspective view illustrating the exterior surface of the split chamber.

Figure 11A:
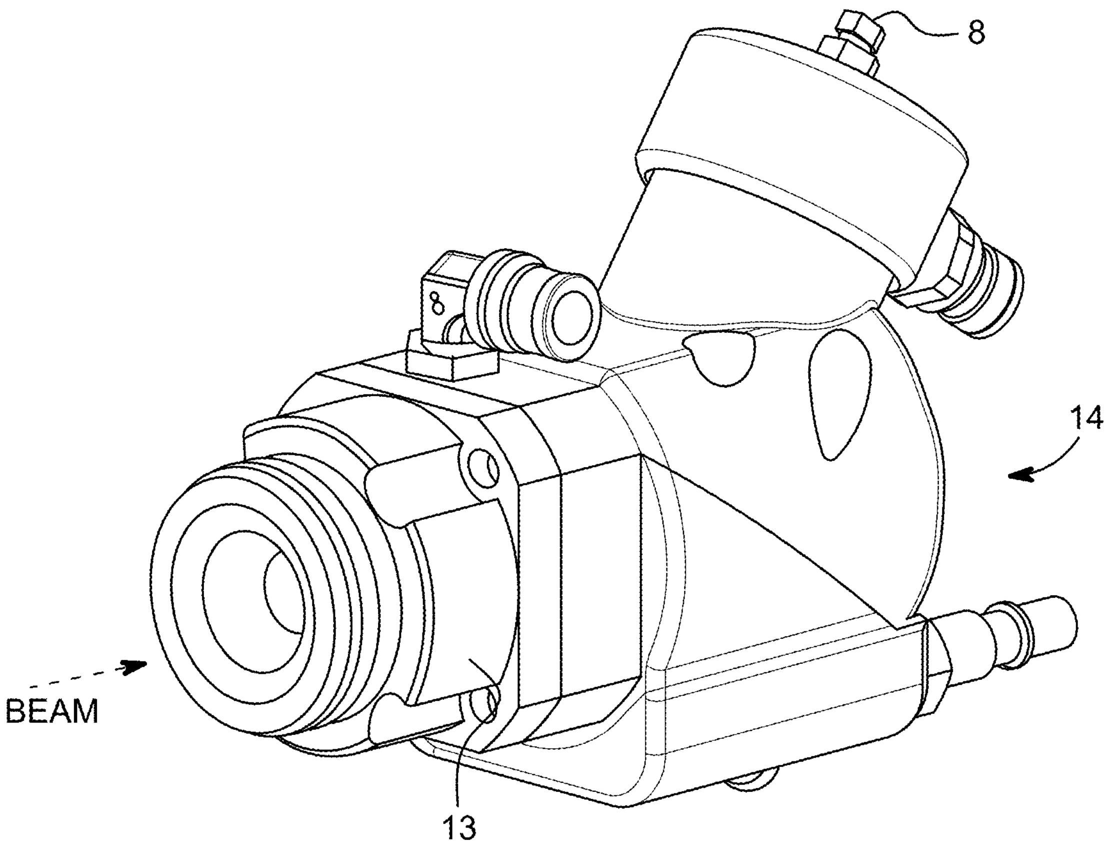

FIG. 11A illustrates a perspective view of the target structure oriented to the opening receiving the particle beam.

Figure 11B:
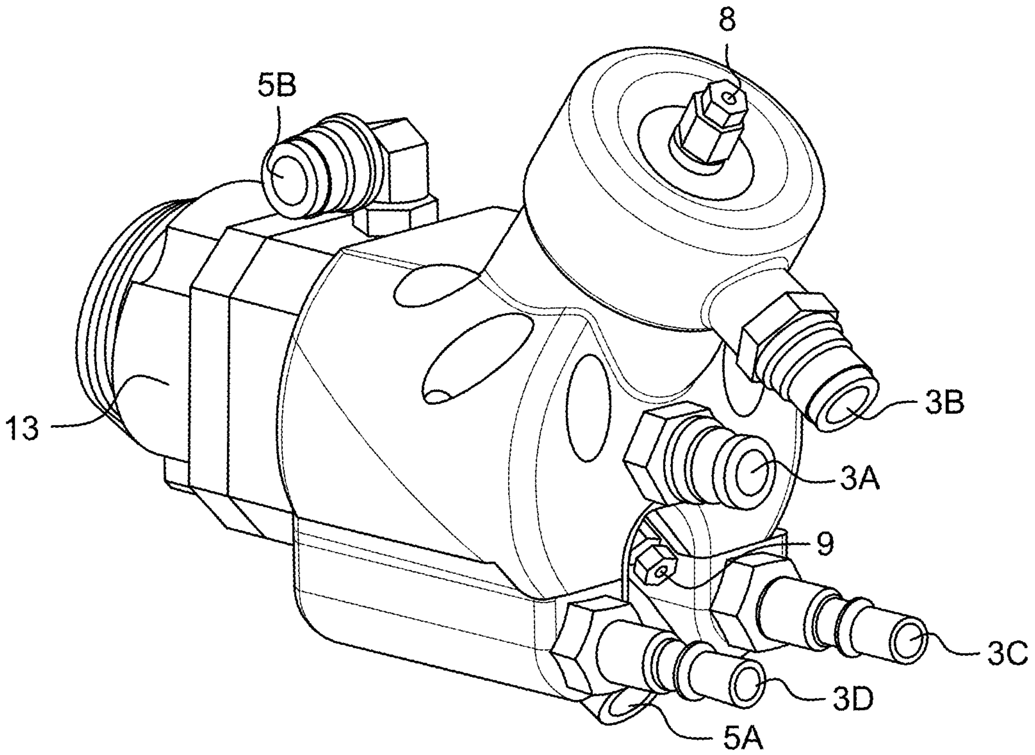

FIG. 11B illustrates an alternate perspective view of the target structure showing the liquid and gas ports.

Figure 11C:
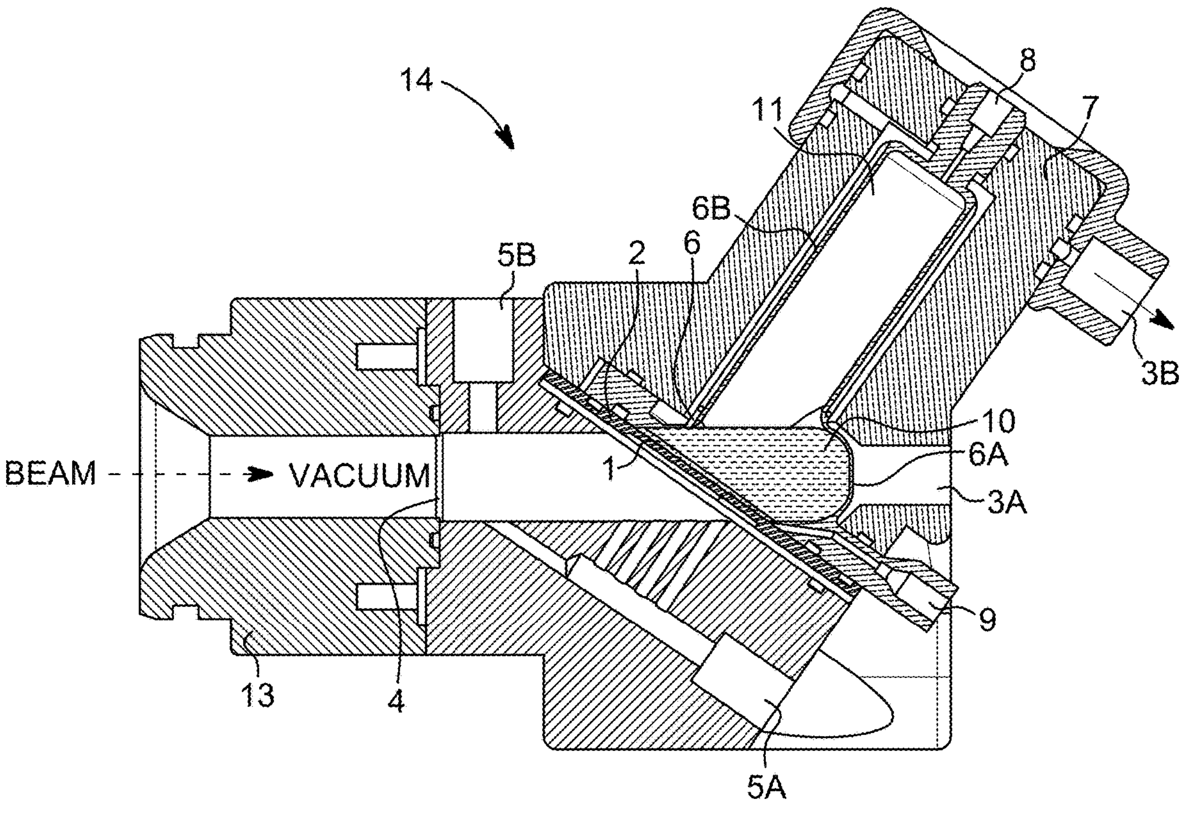

FIG. 11C illustrates a cross sectional detail of a split chamber showing the liquid reservoir and gas expansion chamber wherein the irradiated product may be dissolved and removed through the illustrated ports.

Figure 12A:
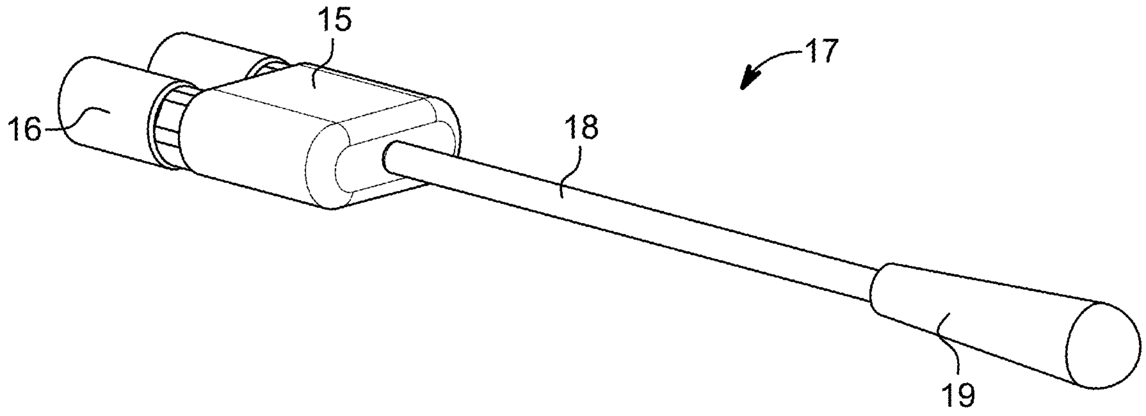

FIG. 12A illustrates an elongated tool that allows removal of a component of a target structure containing irradiated target material.

Figure 12B:
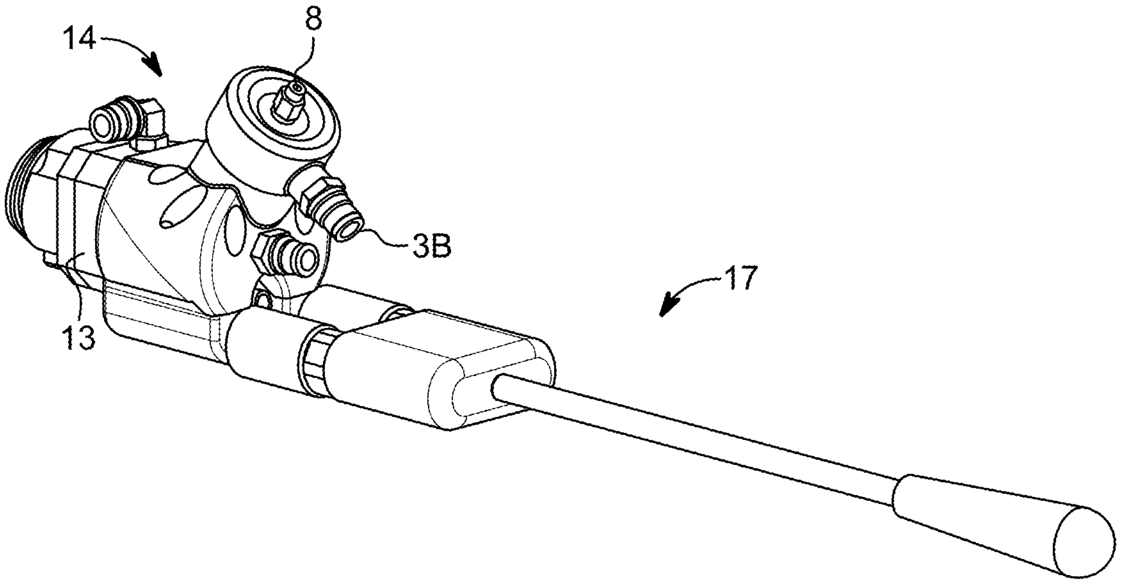

FIG. 12B illustrates the tool with connector fitting complementary to the target structure.

Figure 13:
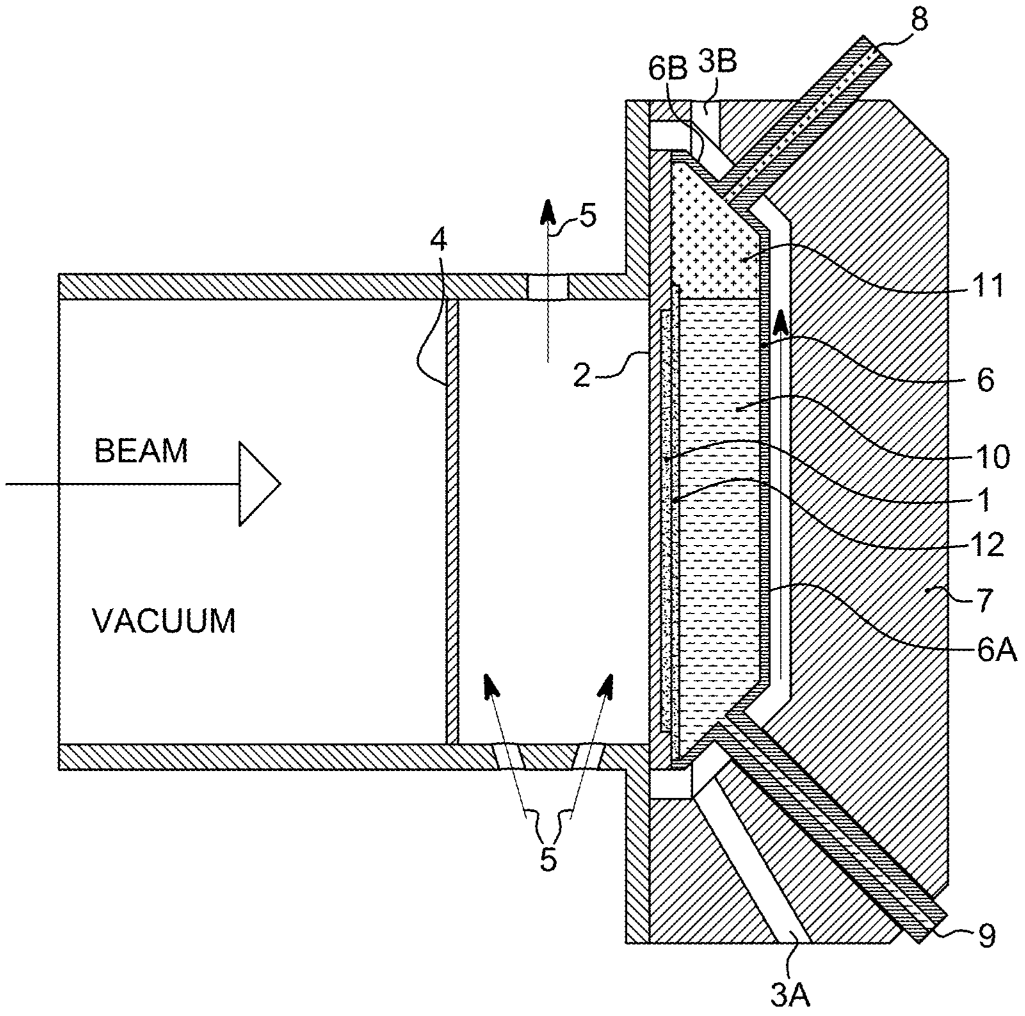

FIG. 13 illustrates another embodiment wherein the gas expansion chamber is an extension of the liquid reservoir. The structure comprising the liquid reservoir extends above the liquid interface with the solid target. This expanded structure creates a volume that can be used to capture and condense fluid vapor created by the heating of the liquid phase of the fluid. Inlet and outlet ports are also illustrated.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort while complex and time-consuming, would nevertheless be a routine undertaking for those of ordinary skill in the art having the benefit of this disclosure.

The novel elements taught by this disclosure may be utilized in either a cyclotron or linear accelerator. These devices may be referred to collectively as particle accelerators.

The chemical element subjected to this bombardment is referred to herein as the "target." The target is held within the orientation of the stream of particles by means of a target structure. The target structure is assembled from multiple components. In some embodiments, many of the components are made of Aluminum. These components can be assembled and attached using various subcomponents such as threaded screws bolts fitting into threaded holes. The assembled target structure can also be structured and described as forming a rigid but quickly detachable structure. Other attachment fixtures could be used including snaps, latches and "lock-and-twist" fittings. The fittings may incorporate detent mechanisms with complementary protrusions and indentions to mate adjoining components of the target structure. It will be appreciated that such devices, e.g., as snaps and latches can facilitate prompt and quick assembly and disassembly of the target structure (or the target handle to the target structure). This can be advantageous when manually removing the now radioactive target material or target structure from the particle accelerator. This is one of the novel features of this disclosure.

In another novel embodiment, portions of the target structure may comprise radioactive insulating or shielding material to enhance safe transfer of irradiated materials required for additional processing. In one embodiment, this shielding material could be used in the target structure component containing the split chamber discussed below.

In yet another embodiment, a tool with an elongated shaft may be used to attach to and remove the portion of the target structure housing that contains a split chamber as described more completely below. The tool may be dimensioned to fit into portals of the target structure used to convey cooling fluids. The fluid conveying tubing or conduit would need to be removed prior to the attachment of the tool.

In still another embodiment of this disclosure, the target is positioned into the target structure as part of the assembly of the target structure components.

The target elements can be in a liquid or solid phase. In the liquid phase, the chemical element can be a solution with a solvent or in a liquid phase of a pure element.

It will be appreciated that the target is positioned within the target structure perpendicular to the stream of particles. Alternatively, the target material can be positioned at an angle to the particle stream.

A principal constraint in the manufacturing of radioisotopes utilizing a cyclotron accelerator is the production of heat. It is necessary to abate this heat within the target structure. This can be achieved in various ways, including but not limited to maintaining a flow of chilled helium gas or chilled liquid, such as water, through the structure.

It will also be appreciated that the cyclotron conducts the accelerated particles through a vacuum. It is convenient to separate the vacuum from the atmosphere within the target structure. The target is isolated and separated from the cyclotron. This is important not to contaminate the cyclotron structure. This separation is typically achieved by an isolation window, i.e., a thin strip or foil of metal or other substance such as Aluminum or HAVAR alloy. A chemically inert foil may be inserted between the window and the target material to protect the particle accelerator from contamination. It will be appreciated that Niobium and Tantalum are suitable metals for this purpose due to their inertness, resistance to acids and low residual radioactivity. The thin strip has an inner surface, i.e., proximate to the cyclotron and distal to the target. The foil window prevents gas or other material from entering the cyclotron. It does not however significantly impede the particle beam. The outer surface of the foil is proximal to the target within the target structure.

As discussed in greater detail below, it is important that the energy of the particle beam be within a specified range corresponding to the desired nuclear reaction, to control the alteration of the nuclei of the target material. When the minimum energy of the beam provided by the particle accelerator cannot be reduced to the required energy for the desired nuclear reaction, an energy degrader is used. As the name implies, the energy degrader can serve to dampen the energy of the particle beam irradiating the target. The energy degrader will be of a solid plate that intersects the particle beam path prior to the beam irradiating the target. Typically, an energy degrader is placed after the isolation foil. In an embodiment, the foil may be optional if an energy degrader is utilized. In another embodiment, the isolation foil may be needed if the degrader is subjected to cooling with Helium gas. In such a configuration, the isolation foil separates the particle accelerator from the front side of the degrader (proximal to the accelerator). It will be appreciated that the target will be on the opposite side of the degrader. Alternatively, the isolation foil can also be used as an energy degrader.

It will also be appreciated that the energy degrader functions to normalize the energy of the particle beam. The strength of the particle beam can vary with the manufacture of the cyclotron. For example, the respective proton energy varies among several cyclotron models as follows: IBA Cyclone and Kiube 18 MeV; ACSI 19 or 24 MeV; and GE PETtrace 16.5 MeV.

It will also be appreciated that the particle beam energy may need to be dampened to avoid production of unwanted isotopes.

This disclosure teaches the use of Aluminum, Niobium, Tantalum or other metals for energy degraders for the production of radioactive metals, also called radiometals, such as $^{68}$Ga from $^{68}$Zn, $^{64}$Cu from $^{64}$Ni, $^{89}$Sr from $^{89}$Y, $^{123}$I from $^{123}$Te, etc.

When Aluminum, or another metal chemically incompatible with the target material, is used as an energy degrader, a second foil may be required to isolate the target material from the Aluminum, e.g., Niobium. Continuing into the interior of the target structure, (distal to the particle accelerator) the second foil will be proximal to the above energy degrader. For a solid target, the target material will be placed on the outer surface of the second foil or directly on the energy degrader. If the solid target is a powder, the powder may be contained in an indenture or cavity of a component positioned across the particle beam path (similar to the positioning of a foil). Again, for orientation purposes, the inner surface of this second foil is opposite the outer surface (proximal to the particle accelerator) of the isolation foil discussed in the preceding paragraph. In one embodiment, helium gas may flow between the isolation foil and the degrader or second foil. It will be understood that the path of the flowing gas may be orthogonal to the particle beam path.

Continuing with the discussion of the irradiation of powder target material, in one embodiment the powder is contained in an indenture of a first solid plate or degrader. The plate may be circular or oval. The plate intersects the particle beam path. There can be a second solid plate have a protrusion of a complementary dimension to the first plate indenture. The protrusion may fit into the indenture, thereby compressing the powder. Behind the second plate may be a cavity for holding water or other liquid or gas for cooling. This cavity may be in communication with an inlet and outlet to allow liquid to flow through the cavity. This cavity may be termed a combination of a liquid reservoir and vapor capture enclosure. It may be referred to as a split chamber.

This disclosure teaches a novel target structure for irradiating solid target material. In one embodiment, the target structure contains a split chamber. The chamber is placed in contact with the outer surface of an internal foil. The foil can be plated with the solid target or similarly affixed to the outer foil surface. The split chamber has an aperture of a complementary size and shape of the solid target material positioned on the internal foil. The split chamber may be made of acid resistant material.

The split chamber is positioned within a housing component of the target structure. One portion of the split chamber forms a reservoir for placement of a liquid, e.g., sterile water. The portion of the split chamber may be termed "reservoir." Connected to and above the reservoir is a second portion of the split chamber that may receive vapor from the liquid in the event the liquid temperature increases. This second portion may be termed "expansion chamber" or "vapor capture enclosure." The end of the expansion chamber may have an aperture for receipt of pressurized gas or liquid, i.e., fluid. It will be appreciated that the expansion chamber or vapor capture enclosure may be dimensioned to hold a volume of fluid vapor with minimal resulting pressure. This is another novel feature of the disclosure.

As indicated above, the solid target material fits adjacent and in communication with the opening of the split chamber. The opening of the split chamber may be attached to a flange wherein the flange contacts the internal foil, but not the portion of the foil with the solid target. This communication allows the liquid within the liquid reservoir to contact the surface of the target material.

In an embodiment the lower portion of the reservoir, the split chamber also has controllable orifices or portals for closeable input and outlet for fluid. These portals can allow filing of the reservoir as well as purging the split chamber of liquids or gases.

It will be appreciated that unlike the prior art, the target material is positioned on the outer portion of a foil or degrader and accessible to the interior of the split chamber. The target material may be in contact with the liquid. The split chamber can be purged of the liquid or gas, including particles of radioactive isotopes created by the irradiation of the target with the particle beam.

Further, the split chamber is surrounded by a jacket having a space allowing for the circulation of cooling fluid such as helium or water. As will be discussed below, this can cool the outer surface of the split chamber, particularly the expansion chamber. This cooling jacket comprises part of the target structure. This can also alleviate the build of vapor pressure which may damage the foil or target.

As noted, heat is a significant by-product of the irradiation activity. This factor illustrates another novel aspect of the disclosure. As the beam irradiates the target, the target and/or degrader are heated. This heat is absorbed into the liquid contained in the reservoir. Additionally, after passing through the target, the dampened particle beam deposits energy into the liquid contained in the reservoir producing more heat. The liquid temperature is raised, thereby causing some of the liquid to evaporate and enter the gas phase.

The vapor rises above the liquid surface and contacts the cooled surface of the expansion chamber. This may result in condensation of the vapor into liquid. This second phase change also requires the absorption of heat energy into the chamber walls and the liquid circulating in the cooling jacket, thereby removing the heat from the chamber.

It will be appreciated that the radioisotopes produced by the irradiation of the target may leach or otherwise transfer into solution with the liquid. This phenomenon also teaches another novel aspect of this disclosure. After completion of the irradiation, much, if not all, of the radioisotopes may have migrated into the solution by thermal diffusion or other means. The liquid in the chamber can contain an acid, including a weak or diluted acid, to facilitate the thermal diffusion process. The controllable portal within the expansion chamber and the controllable portal at the bottom of the reservoir may be opened and the radioisotopes may be drained from the target structure for further processing.

Also, the isotopes formed from the irradiated target material may be concentrated on the outer surface of the target. This outer surface is proximate to and in contact with the liquid. Exposure of this surface to a weak acid may "etch" the target surface of the radioisotope, leaving much of the target material in its original nuclear state. The "etching" facilitates removal of the isotopes from the target surface. It will be appreciated that a weak acid is an acid that is partially dissociated into its ions in an aqueous solution of water. At the same concentrations, weak acids have a higher pH value than strong acids. The properties of a weak acid may facilitate the removal of the outer surface of the target material without alteration of the substrate. It will be further appreciated that this liquid, e.g., acid rinse, may be a suitable for radionucleotide diagnostic purposes.

Moreover, the above steps, i.e., thermal diffusion facilitated by a weak acid to leach the radioisotope into the liquid, may preserve much of the original target material, e.g., zinc, such that the target material can be reused. Dissolution of the target foil is therefore not required.

Furthermore, another novel aspect of this disclosure is that the split chamber, in conjunction with the controllable opening and closing of the portals may be filled with a liquid that will remove remaining product, i.e., the radioactive radioisotopes, from the outer surface of the foil. In one embodiment, this target product removal step may be accomplished by introducing dilute acid, such as HCl, through the upper or lower portal of the expansion chamber. The particle beam could be used to increase the temperature of the acid, to optimize the dissolution process. The dilute acid may then be drained through the lower portal of the reservoir. This process may be enhanced by then introducing pressurized gas through the expansion chamber portal and out from the reservoir portal. The introduced gas may be inert gas such as Argon, He, etc. This process can also be used to recover the target material.

The radioactive radioisotopes, now in fluid solution, may be safely conveyed from the target structure to a processing station, i.e., "hot cell."

It will be appreciated that this transfer of the radioactive and harmful radioisotopes can be performed without worker activity in proximity to this now radioactive material. This is unlike the prior art wherein removal of the radioisotopes required workers to disassemble the target housing or rely upon remote mechanical, motor or pneumatic driven opening of the target housing. In such prior art, workers were required to accomplish the removal of the radioisotopes by activity in close proximity to the radioactive product. Alternatively, automated mechanical or pneumatic transfer systems were used in the prior art. These automated systems are complex and expensive. Additionally, these systems require large passages through the accelerator or target shielding. Those, passages are difficult to add to existing installations.

This disclosure also teaches the production of radioisotopes where the target material is in powder form, e.g., $^{44g}$Sc radioisotope from $^{44}$Ca powder. Note add that the solid powder may be placed on an energy degrader. Another novel aspect of the teaching of this disclosure is covering the pressed powder (which may be positioned on an energy degrader or foil) with a metal foil such as Zinc to contain the powder and/or protect it from reaction with water, e.g., $^{44}$Ca reacts violently with water. After completion of irradiation, the foil and the target material containing the radioactive product may be dissolved with acid, e.g., dilute HCl. The now dissolved target material, product and foil material will have to be separated during subsequent processing, e.g., separating $^{44}$Ca, $^{44g}$Sc and Zn.

It will be appreciated that the teachings of this disclosure include, but are not limited to, creation of the following radioisotopes: $^{18}$F from $^{18}$O and $^{13}$N from $^{16}$O. In this case the target material will be the liquid contained inside the chamber, instead of solid form.

It will be appreciated that the teachings of this disclosure include simultaneous production of multiple radioisotopes, i.e., production $^{44g}$Sc from $^{44}$Ca powder, $^{68}$Ga from $^{68}$Zn foil covering the powder and $^{18}$F or $^{13}$N from liquid contained in the chamber. The radioisotopes produced can be separated during post processing.

Figure 1:
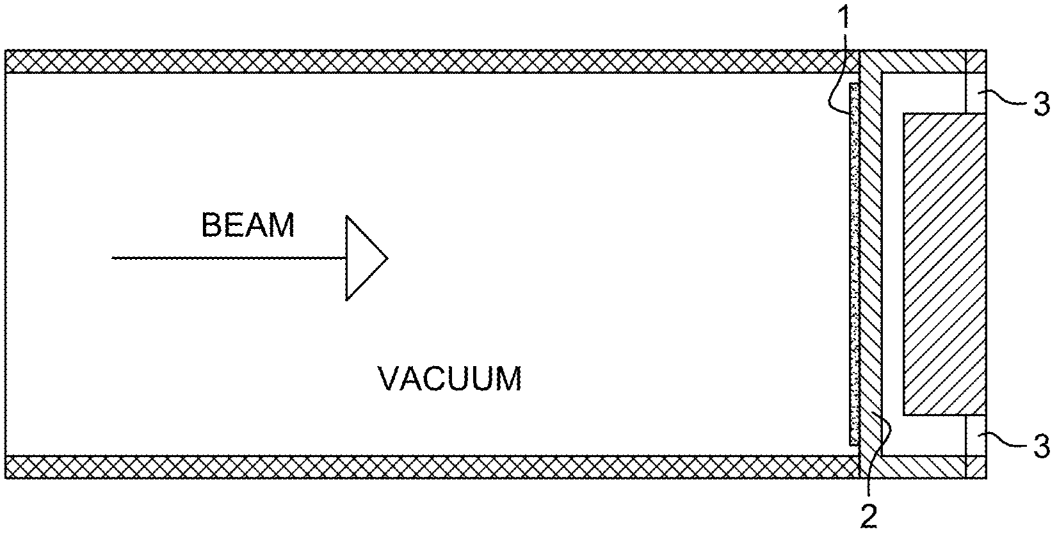
FIG. 1 (PRIOR ART)
FIG. 1 illustrates a prior art target structure and showing the placement of the target on the inner surface of a substrate, e.g., foil or backing material. By "inner" it is meant that the target is proximate to the particle beam, i.e., the inner surface.

Turning now to the drawings, FIG. 1 illustrates a prior art configuration of positioning of the target within a target housing. Illustrated is the direction of the particle beam traveling through the vacuum maintained within the particle accelerator or a beam transport system and entering the target structure 2. Also illustrated is the target material 1 positioned on the inner portion of the backing plate 2, i.e., proximate to the particle accelerator. Also illustrated is the fluid pathway via the cooling fluid ports 3. It will be appreciated that in this view, the target is positioned perpendicular to the beam direction.

Figure 2:
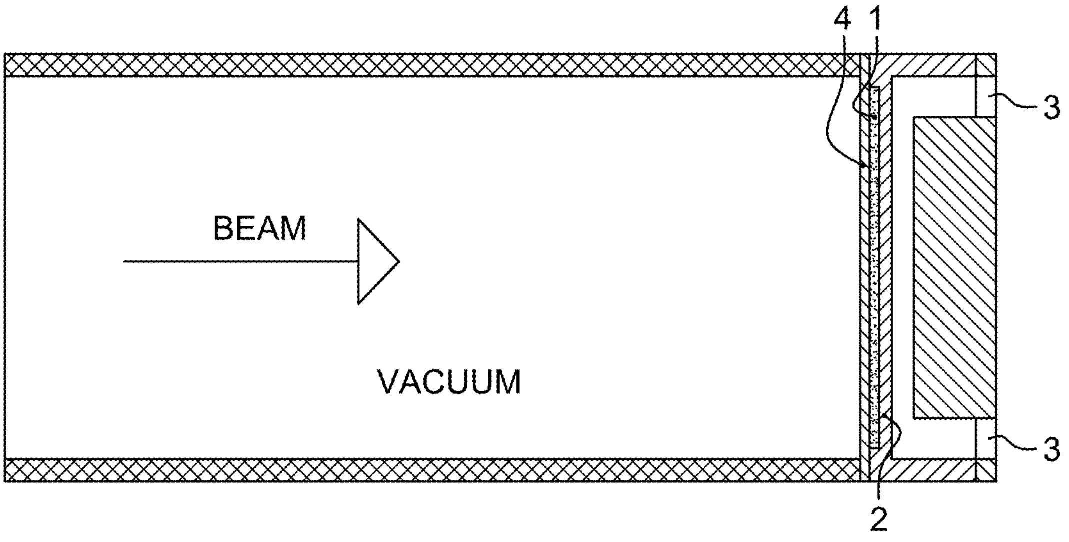
FIG. 2 (PRIOR ART)
FIG. 2 illustrates a prior art target structure and showing the placement of the target on the inner surface of a substrate, e.g., foil or backing material. The target material is isolated from the vacuum by means of a foil or energy degrader.

FIG. 2 illustrates another version of the prior art wherein foil 4 is placed over the target 1. The target is positioned on a backing plate 2. Also shown is the cooling fluid pathway.

Figure 3:
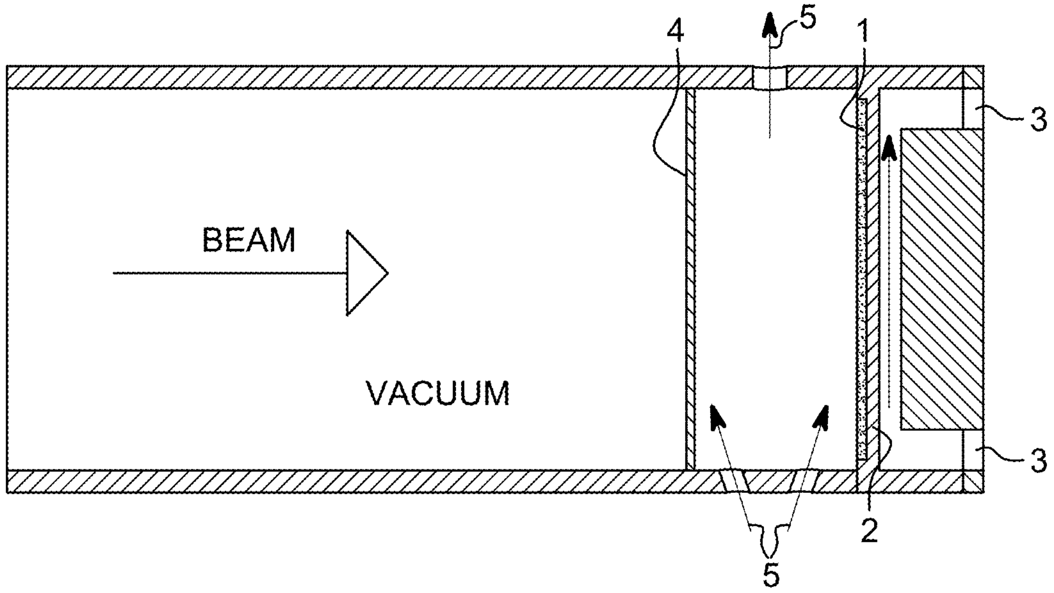
FIG. 3 (PRIOR ART)
FIG. 3 illustrates a prior art target structure and showing the placement of the target on the inner surface of a substrate, e.g., foil or backing material. The target material is isolated from the vacuum by means of a vacuum window. The outer face of the vacuum window and inner face of the target material are cooled by a jet of Helium gas. Again, reference to "inner" and "outer" surfaces is with reference to the interface with the particle beam.

FIG. 3 illustrates the prior art wherein an isolation foil 4 is placed between the ports 5 conveying cooling helium gas and the cyclotron vacuum. Again, the target 1 is mounted on the inner surface (relative to the cyclotron) of the backing plate 2. It will be appreciated that the target may be powder or solid. The target may be pressed power, electroplated or sputter-coated onto the backing plate.

Figure 4:
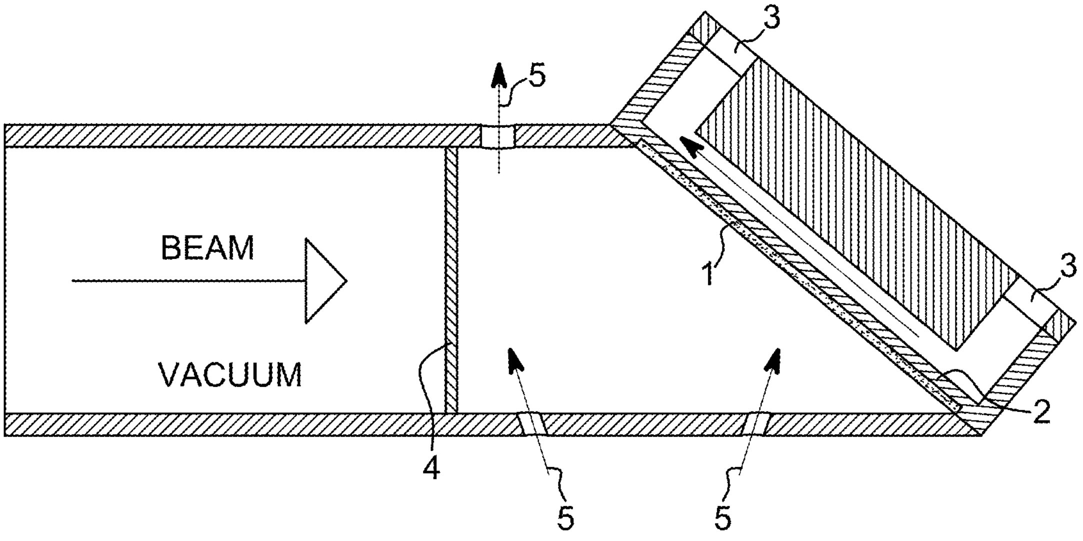
FIG. 4 (PRIOR ART)
FIG. 4 illustrates a prior art target structure and showing the placement of the target on the inner surface of a substrate, e.g., foil or backing material. The target material is isolated from the vacuum by means of a vacuum window. The target is mounted at an angle with the bam direction. The outer face of the vacuum window and inner face of the target material are cooled by a jet of Helium gas.

FIG. 4 illustrates prior art technology wherein the target 1 is at an oblique angle to the particle beam. The target is again positioned on the inner surface of the backing plate. Note again that the vacuum is separated by an isolation foil 4 and the target and foil 4 are cooled by helium gas via portals 5. The target is additionally cooled with liquid flowing in the target structure pathway portals 3.

Figure 5:
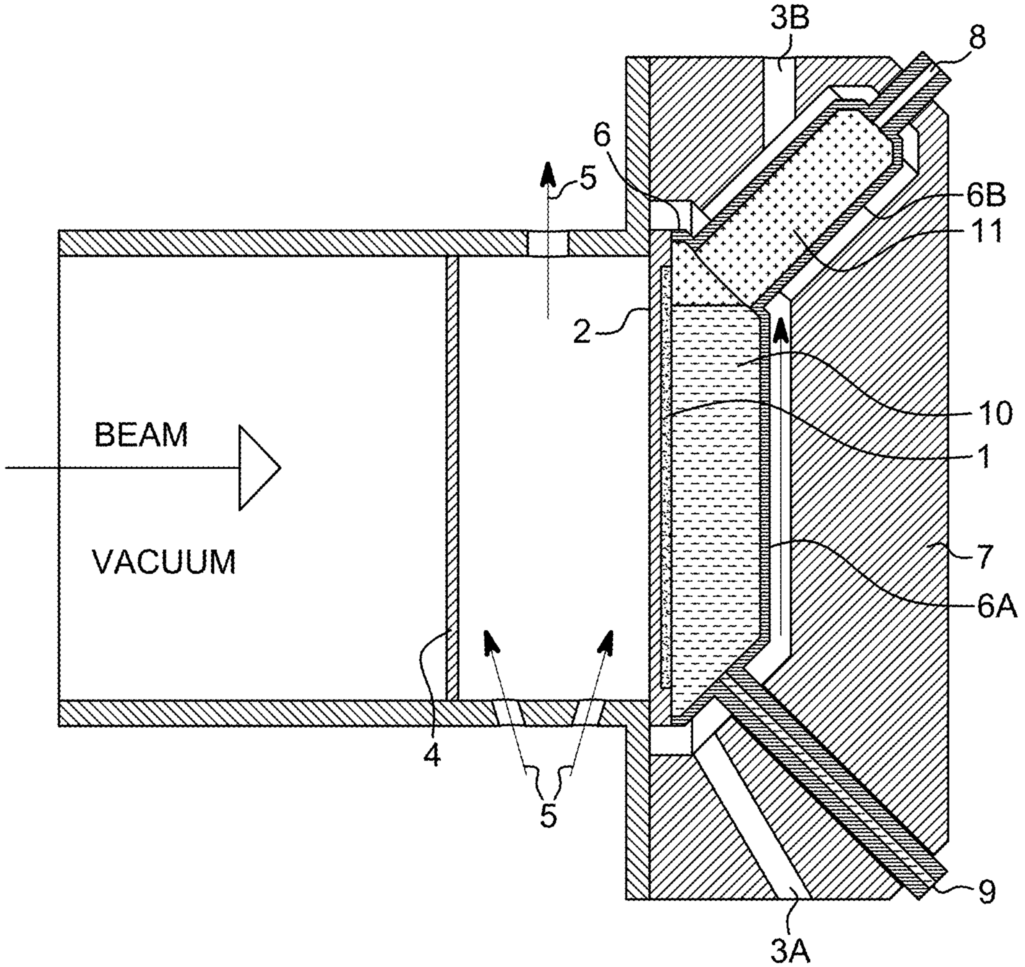
FIG. 5 illustrates a schematic of the disclosure showing a portion of the target structure comprising a cooling jacket with the pathway and connectors for circulating cooling fluid, e.g., water and an optional split chamber holding the target. The liquid in the split chamber is in direct contact with the target material. The target material is now on the outer surface of the foil or backing plate relative to orientation with the beam.

FIG. 5 illustrates the target and target structure of the disclosure. The target structure includes a liquid cooling jacket 7 through which liquid flows as indicated by the arrow. An energy degrader 2 is positioned in front (relative to the particle beam) of the target 1. Also illustrated is the split chamber 6 containing liquid 10 in a reservoir 6A. In this embodiment, the liquid is illustrated to be in contact with the solid target 1. It will be appreciated that the liquid will absorb heat energy created by the irradiation process. The liquid temperature may reach its evaporation temperature. The resulting vapor 11 can be entrapped in the expansion chamber 6B of the split chamber 6.

The split chamber 6 is cooled by the liquid flowing through the jacket 7 and ports 3A and 3B. The vapor 11 may condense on the surface of the vapor reservoir 6B. This will further facilitate the cooling of the target, i.e., the heat absorbed in the phase change from liquid to gas and the heat energy absorbed in the second phase change of vapor returning to liquid via condensation.

The evaporation chamber includes a closeable port 8 through which gas or liquid may be conveyed. The bottom of the liquid reservoir of the split chamber also contains a closeable port 9. It will be appreciated that the liquid or gas may be drained through this port. It will further be appreciated that due to the heat of the irradiation process, the solid target may melt, thereby mixing with the liquid 10. The solid target may also otherwise degrade causing particles to break from the surface, and also mix with the liquid. As discussed above, the produced radioisotopes may be concentrated on the outer surface of the target, and leach into the liquid.

In some embodiments, the solid target illustrated in FIG. 5 may disperse into liquid 10. The irradiated target may then be conveyed through the port 9 with the liquid and vapor within the split chamber 6. In an embodiment, pressurized gas may be pumped through port 8 to facilitate the removal of the now radioactive target material.

In another embodiment, after the liquid and vapor has been removed from the split chamber as described above, the lower port 9 can be closed and an agent such as diluted acid may be pumped into the split chamber 6 through port 8. The acid may be allowed contact with the target material (similar as to the liquid 10 and target 1 contact). The acid may dissolve the target material, thereby allowing the lower port 9 to be opened and the solution removed from the split chamber. Another novel feature of this disclosure is the option to use the particle beam to heat the acid to facilitate the dissolution of the solid target material. Also, the diluted acid may facilitate the leaching of the radioisotope product from the target. It will be appreciated that a diluted acid is an acid in which the concentration of water mixed in the acid is higher than the concentration of the acid itself.

It will be yet further appreciated that the disclosure is not limited to the shape or configuration of the structure that has been termed "split chamber." Other configurations may be utilized. See for example FIG. 13 discussed below. However, it may be appreciated that the split chamber comprising a liquid reservoir in contact with the target surface, combined with a dimensioned vapor capture enclosure extending at an angle from the reservoir is in a shape and position to facilitate encapsulation by the cooling liquid jacket.

Figure 6:
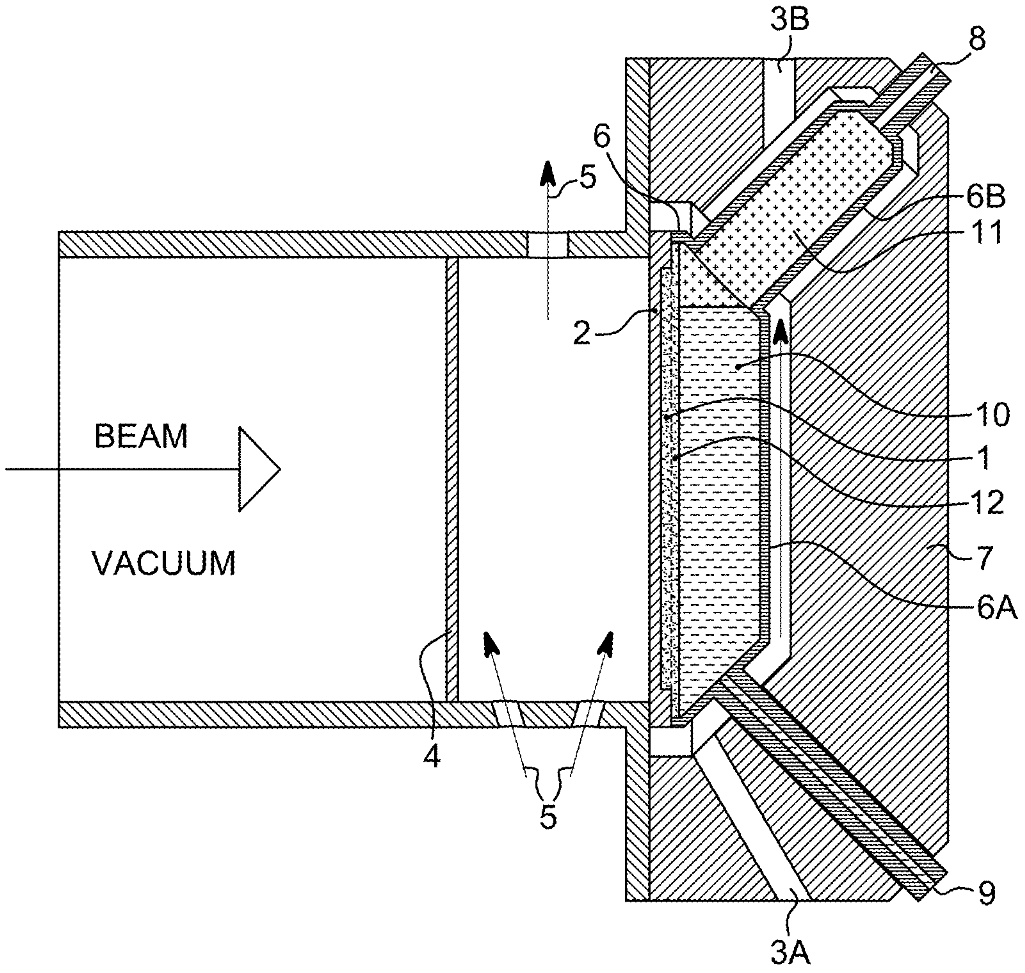
FIG. 6 illustrates a schematic of the disclosure showing a portion of the target structure with the jacketed pathway and connectors for circulating cooling fluid, e.g., water and the split chamber holding the target. A foil of different atomic composition from the target material separates the target from the liquid contained in the split chamber.

FIG. 6 illustrates yet another embodiment of the disclosure wherein the target material 1 is pressed, electroplated, fused, sputter coated or otherwise affixed to the energy degrader 2. In this embodiment, foil 12 can be placed between the target and the liquid 10. Again, in this embodiment, the isolation foil 4 is used to separate the cooling helium gas flowing through ports 5 as indicated by the vector arrows. The target structure also utilizes a cooling liquid jacket 7 wherein the liquid, e.g., water flows through the ports 3A and 3B as indicated by the vector arrow.

Figure 7A:
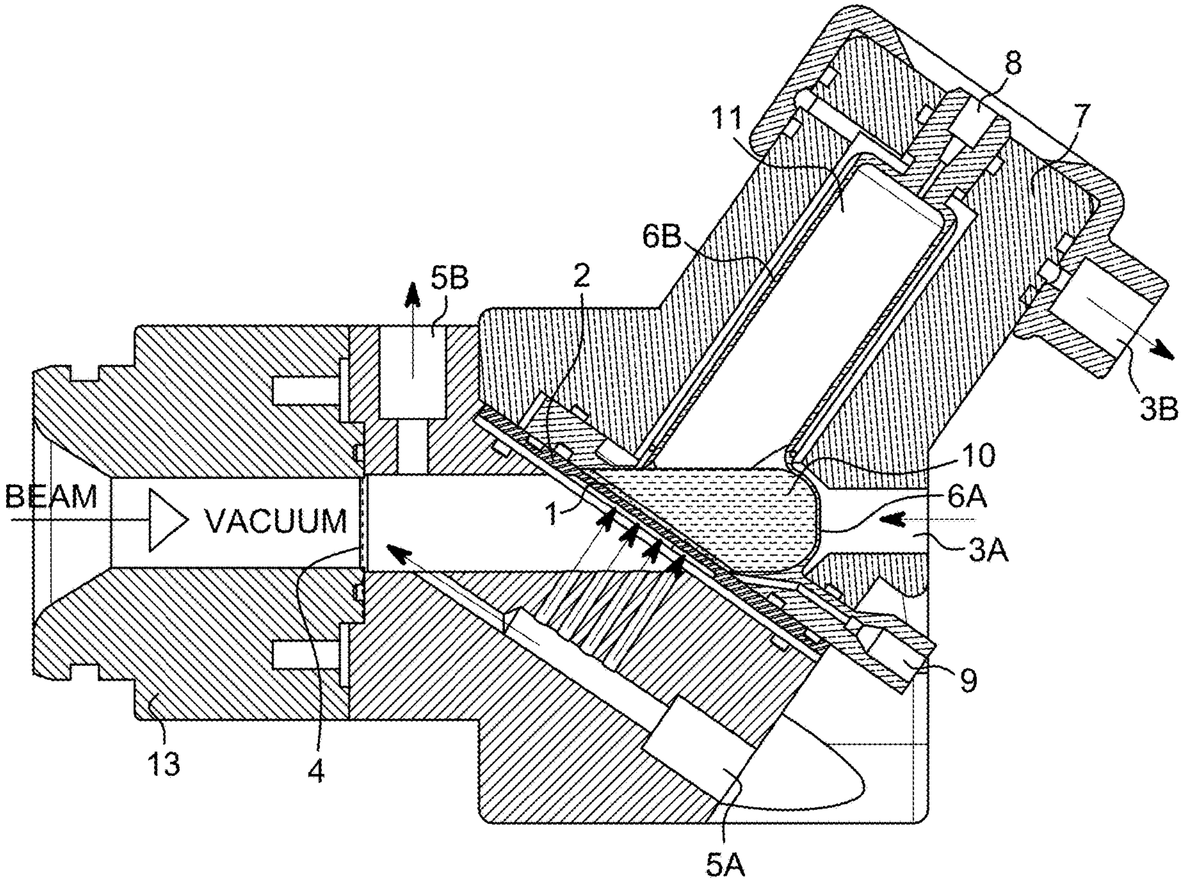
FIG. 7A illustrates an embodiment of the disclosure showing a portion of the target structure within the beam pathway and connectors for circulating cooling fluid, e.g., water and the split chamber adjacent to the target. The target material is plated on the degrader or physically placed on top of the degrader, e.g., target material can be a foil.

FIG. 7A illustrates another embodiment subject of this disclosure wherein the target is positioned at an oblique angle to the orientation of the particle beam. Again, an isolation foil 4 is used to separate the cyclotron vacuum from the cooling fluid, e.g., helium. The gas flows through ports 5A and 5B. Cooling gas is also directed onto the inner surface of the energy degrader (backing plate) 2. It should be appreciated that the isolation foil 4 and corresponding cooling fluid are not mandatory for the functionality of the disclosure. The target 1 is in contact with the liquid 10. Above the liquid layer is the vapor expansion chamber 6B. In this manner, the structure 6 assumes a form of a split chamber, i.e., a lower chamber 6A to hold liquid and an upper chamber 6B to contain vapor 11 from the heated liquid 10. Again, the target structure 6 contains a cooling jacket 7 (gas or liquid) wherein the cooling agent is conveyed through port 3A and exits 3B. This embodiment also contains a front flange component 13, for mounting to the cyclotron or beamline port. The front flange component 13 can be adapted to fit into multiple cyclotron brands and models.

Figure 7B:
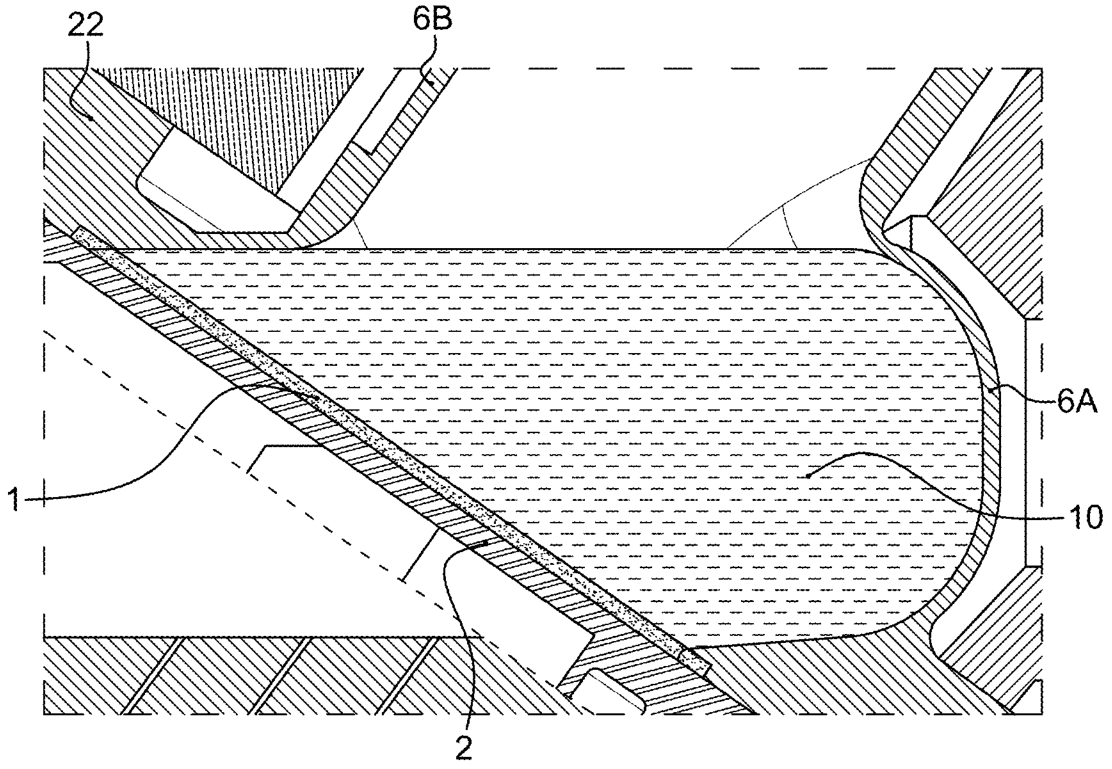
FIG. 7B is a detailed cross-sectional view of an embodiment of the relationship between the target and the liquid portion (reservoir) of the split chamber.

FIG. 7B provides a detailed cross-sectional view of the liquid reservoir of the split chamber 6. Note that the reservoir 10 interfaces with the target 1 at an angle to the particle beam. A portion of the elongated "chimney" structure of the vapor capture enclosure 11 is also shown. The attachment portion of the fluid cooled jacket 7 is also shown.

Figure 8:
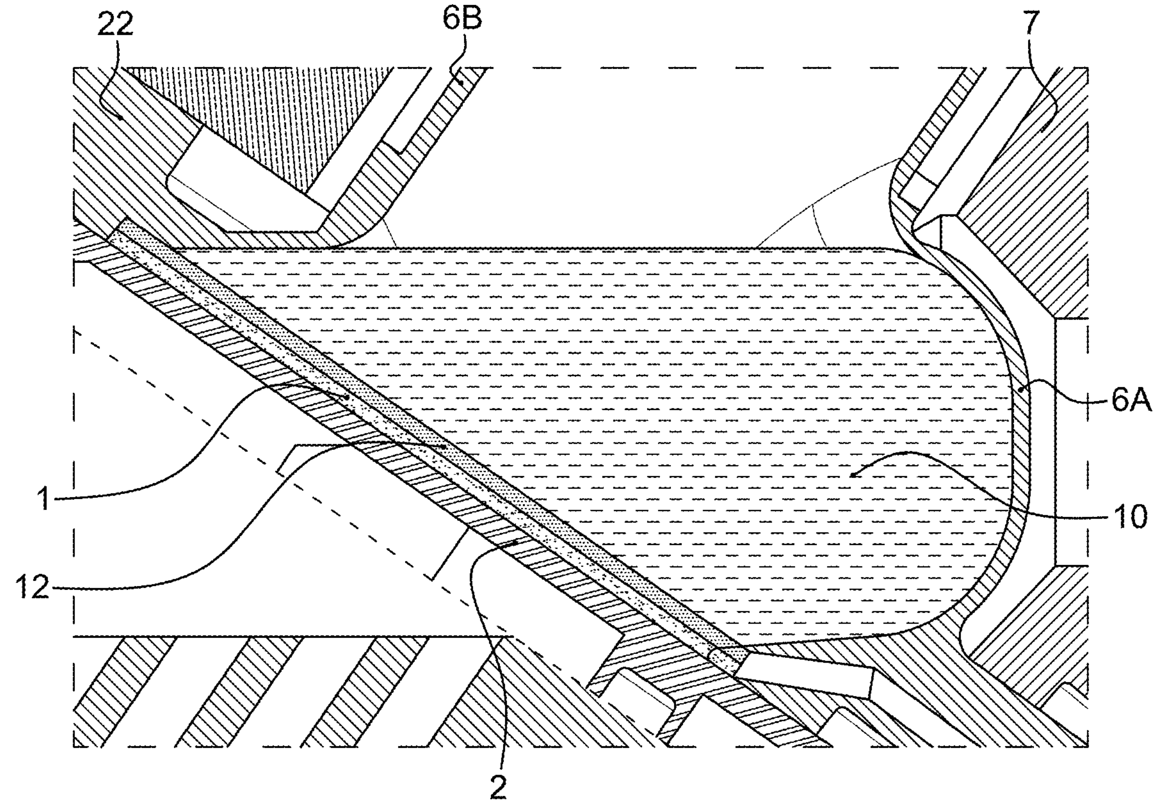
FIG. 8 illustrates an embodiment of the disclosure where the target material is now covered with a foil.

FIG. 8 provides a detailed cross-sectional view of an embodiment wherein a foil 12 is positioned between the target 1 and the cooling liquid 10. This orientation may be used when the target material may react with the liquid, independent of the changes caused by irradiation. For example, calcium reacts with water.

Figure 9:
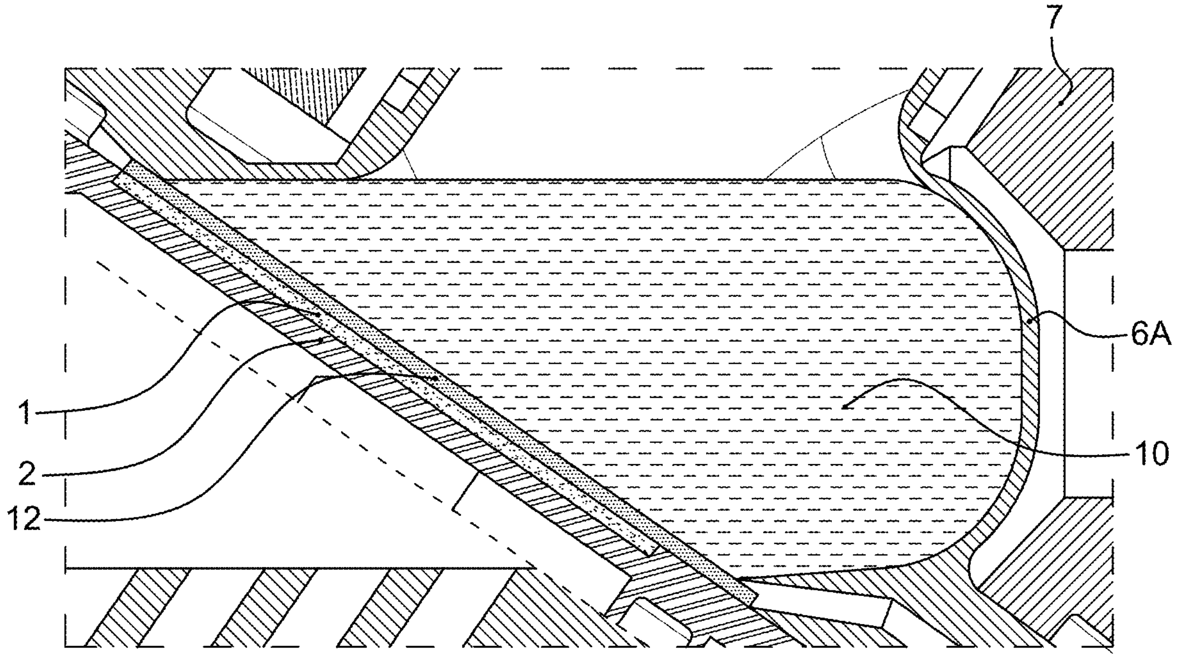
FIG. 9 illustrates an embodiment of the disclosure where the target material is melted or pressed into a recess fabricated into the degrader. The target material is shown covered with a foil.

FIG. 9 illustrates an embodiment wherein solid target material 1, in powder form, may be pressed into a recess of a plate 2 (here an energy degrader). In this embodiment, the pressed powder is separated from cooling liquid 10 by a foil 12.

FIG. 10A is a cross sectional view of the split chamber 6, fluid port 8, fill and transfer port 9, the liquid reservoir 6A and vapor expansion chamber 6B. The dimensional volume 11 of the vapor capture enclosure or chamber is also shown. Recall that the size of the vapor capture enclosure may be varied to minimize the vapor pressure. Note also, the structure of the liquid reservoir 6A and vapor capture enclosure 6B may be encapsulated or surrounded by a fluid cooled jacket (not shown). The target material 1 is positioned on a plate or energy degrader 2. The target is positioned on the outer (opposite) surface of the energy degrader in relation to the particle beam.

FIG. 10B is an additional cross-sectional view of the split chamber 6A 6B but showing the target 1 material pressed or positioned in an indenture to the energy degrader 2 and covered with another plate or foil 12.

FIG. 10C is a perspective view of the split chamber 6 showing a portion of the interior. The interior comprises the liquid reservoir and vapor capture enclosure. The opening 20 is positioned adjacent to the target and energy degrader (not shown). Note that the opening structure 21 is elongated as appropriate for the split chamber being positioned at an oblique angle to the direction of the particle beam (not shown). Also illustrated is a flange 22 component that allows the split chamber to be attached to the target structure such as the energy degrader.

FIG. 10D is another perspective view of the exterior of the split chamber 6 showing the exterior of the vapor expansion chamber 6B, the protruding outer surface of the liquid reservoir 6A, the fluid port 9 and the fluid port 8. Also illustrated is the flange 22. Recall fluid, including the liquid from the liquid reservoir which may contain irradiated target material, may be purged from the split chamber via the fluid port 9 including with the addition of fluid via fluid port 8. Note the purity of the fluid can be controlled versus continually circulating fluid, e.g., water, through the cooling jacket (not shown).

FIG. 11A illustrates a perspective view of the target structure 14. The perspective view is the exterior of one embodiment of the target structure 14. The “front” or proximal section of the target structure is oriented toward the cyclotron as shown by the vector arrow representing the particle beam. The particle beam is illustrated entering the front of the structure through the front flange mount adapter 13. It will be appreciated that the beam may first encounter an isolation foil, assuming that the target and target structure are being cooled by gas or another fluid.

FIG. 11B is a reverse perspective view of the target structure 14. Illustrated are the various ports that convey cooling fluids (liquid or gas). Included is the illustration of the gas port 8 leading into the vapor expansion chamber of a split chamber (not shown) as well as the fluid port 9 leading from the liquid reservoir. It will be appreciated that “hybridized” solid irradiated target material transformed into a liquid conveyable form may be safely conveyed out of the target structure through the fluid port 9 to a processing unit. Various external components are illustrated including liquid portals 3A, 3B, of the cooling jacket, front flange 13 and energy degrader liquid cooling portals 3C, 3D and gas cooling portals 5A and 5B. The gas (or fluid) cooling ports 5A and 5B may convey helium as previously discussed.

FIG. 11C illustrates a cross sectional view of the target structure 14 depicted in FIGS. 11A & 11B. Various internal components are illustrated including the isolation foil 4, target 1, split chamber 6, (6A, 6B) split chamber portals 8, 9, cooling jacket 7, fluid, e.g., liquid portals 3A, 3B conveying fluid through pathways and connectors of the cooling jacket, and fluid, e.g., helium gas, cooling portals 5A, 5B.

FIG. 12A illustrates an elongated tool 17 that can be used in one embodiment to convey the target structure 14 away from the cyclotron for maintenance purposes. The elongated handle shank 18 and handle grip 19 allows a worker conveying the structure to remain safely distant from the irradiated (radioactive) target structure. The elongated tool 17 includes attachment component 15 having quick attachment connectors 16 that are complementary to the fluid portals (not shown) of the target structure 17.

FIG. 12B illustrates the elongated tool 17 attached to the target structure 14 through the quick connectors 16.

FIG. 13 illustrates a cross sectional view of another embodiment of the disclosure wherein the vapor expansion enclosure 6B is an extension of the liquid reservoir 6A. Also shown are the fluid ports 8, 9 of the chamber, the fluid cooling jacket 7, and fluid ports 3A, 3B. Note that foil 12 covers and separate the target 1 from the liquid 10. The fluid ports 5 for conveying, for example, helium, are also shown.

This specification is to be construed as illustrative only and is for the purpose of teaching those skilled in the art the manner of carrying out the disclosure. It is to be understood that the forms of the disclosure herein shown and described are to be taken as the presently preferred embodiments. As already stated, various changes may be made in the shape, size and arrangement of components or adjustments made in the steps of the method without departing from the scope of this disclosure. For example, equivalent elements may be substituted for those illustrated and described herein and certain features of the disclosure maybe utilized independently of the use of other features, all as would be apparent to one skilled in the art after having the benefit of this description of the disclosure.

While specific embodiments have been illustrated and described, numerous modifications are possible without departing from the spirit of the disclosure, and the scope of protection is only limited by the scope of the accompanying claims.

I claim:

1. A method of producing radioisotopes by irradiating a target with a particle beam, the method comprising:

(a) placing the target comprising a solid target material on or within a target structure, wherein the target is positioned in a beam path of the particle beam from a particle accelerator;

(b) positioning a liquid reservoir adjacent to the target, (i) wherein the liquid reservoir is positioned behind the target in relation to the beam path, (ii) wherein the liquid reservoir contains a liquid, (iii) wherein the liquid contacts at least a portion of the solid target material, and (iv) wherein the liquid reservoir includes a vapor-capture enclosure;

(c) irradiating the target material with the particle beam to produce the radioisotopes;

(d) during the irradiating, removing heat from the target by evaporating at least a portion of the liquid to produce a vapor from heat generated in the liquid by the irradiating, capturing in the vapor-capture enclosure the vapor, cooling the captured vapor by an effective thermal amount to cause condensation of the captured vapor to produce a condensate, and returning the condensate to the liquid reservoir;

(e) collecting the liquid from the liquid reservoir after the irradiating;

(f) introducing a second liquid into the liquid reservoir;

(g) isolating at least a portion of the radioisotopes from the irradiated target material in the second liquid; and (h) removing the at least a portion of the radioisotopes and the second liquid from the liquid reservoir.

2. The method of claim 1, further including placing a fluid-cooled jacket over the vapor-capture enclosure and the liquid reservoir.

3. The method of claim 1, further including forming a first closeable fluid port through a portion of the vapor-capture enclosure and forming a second closeable fluid port through a bottom portion of the liquid reservoir, wherein the liquid or the second liquid or both the liquid and the second liquid can be added to or withdrawn from the vapor-capture enclosure or the liquid reservoir via either the first closeable port or the second closeable port, respectively.

4. The method of claim 1, wherein the collecting the liquid from the liquid reservoir after irradiating further includes collecting at least a portion of the produced radioisotopes in the liquid.

5. The method of claim 1, further including using an acid as the second liquid.

6. The method of claim 5, wherein the acid is a weak acid.

7. The method of claim 5, wherein the acid is a diluted acid.

* * * * *